A. M. BAILEY.
MILKING-PAIL.
No. 170,463. Patented Nov. 30, 1875.
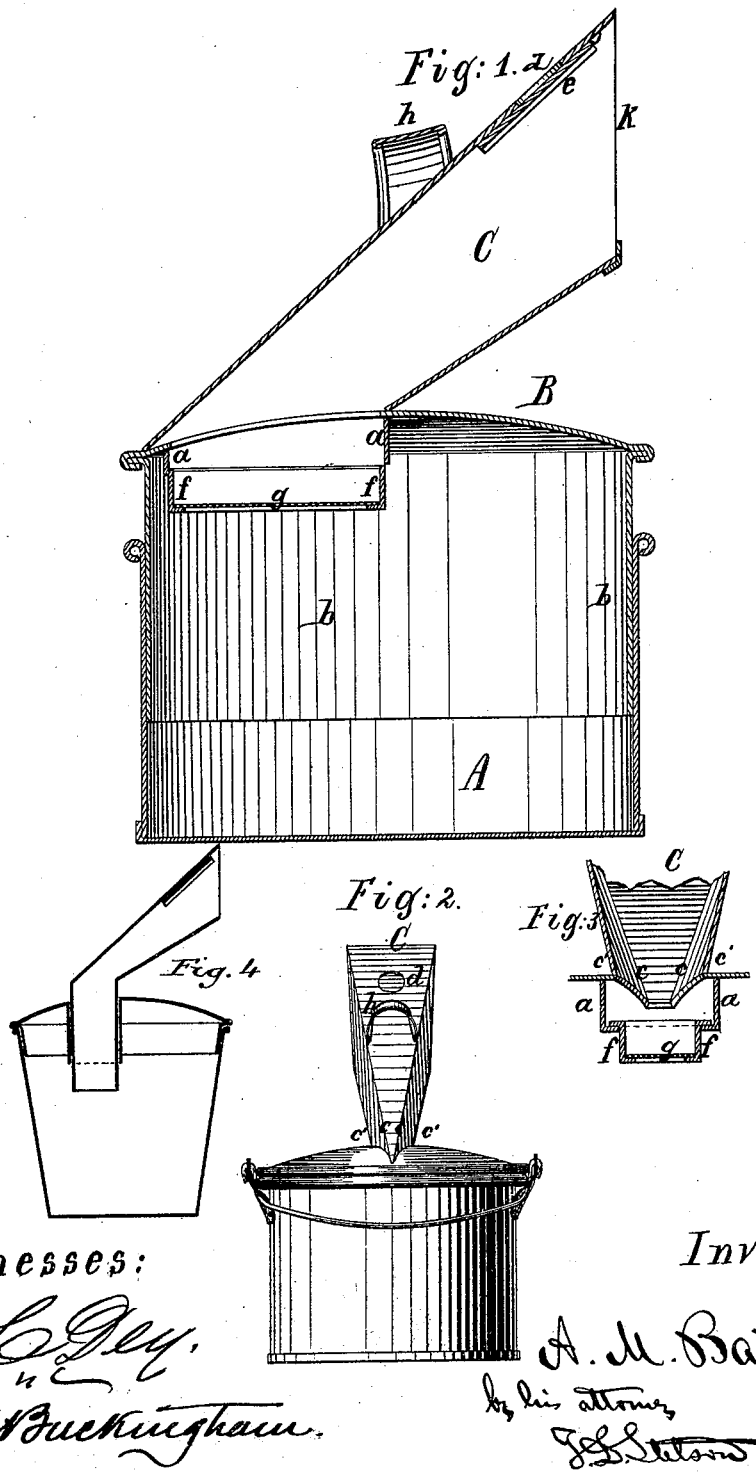

UNITED STATES PATENT OFFICE.

ALFRED M. BAILEY, OF MIDDLEFIELD, CONNECTICUT.

IMPROVEMENT IN MILKING-PAILS.

Specification forming part of Letters Patent No. 170,463, dated November 30, 1875; application filed March 3, 1875.

*To all whom it may concern:*

Be it known that I, ALFRED M. BAILEY, of Middlefield, in the county of Middlesex and State of Connecticut, have invented certain new and useful Improvements relating to Milk-Pails, of which the following is a specification:

I have provided an attachment to the common milk-pail to prevent the dropping into the milk of fragments of dry dung or other substances—accidents the entire prevention of which, by ordinary care, every farmer acknowledges to be impossible, and the evil effects of which subsequent straining only imperfectly remedies. I also provide a cover, a deep rim of which telescopes inside the pail, so tightly fitted that the cover may be shut close down on the brim of the pail, or may be supported four or five inches above it by the friction of the parts. The milk is projected laterally into the hood, and descends into the pail through an opening provided. An aperture in the top of the hood covered by a piece of glass allows the milker to see the stream even if the teat is held close to the hood. A sliding strainer, made so as to be easily removed and cleaned, is placed below the oblong hole of the cover. To operate it the attachment may be placed upon a common pail, adjusted to the right height, filled with milk from one or more cows, and then taken off and applied on another pail, being conveniently manipulated by the handle in the top of the hood.

The accompanying drawings form a part of this specification, and aid in describing what I consider the best means of carrying out the invention.

Similar letters of reference indicate the same parts throughout.

Figure 1 is a vertical section; Fig. 2, a view from behind; Fig. 3, a cross-section, showing the hole through the cover.

A represents a common pail; B, a cover, of which the rim $b$ extends far down within the pail, and fits with considerable friction. The funnel or hood C is set at an angle upon the cover, its sides approaching closely at the back $c\ c$, but more separated in front $c'\ c'$. It has in its top the hole $d$, which may be much larger than is shown. It is covered by the sliding glass $e$, which is conveniently removed for cleaning. Beneath the hole in the cover is soldered the open box $a\ a$, in which slides the tray $f\ f$, with the sieved bottom $g$. The attachment is carried by the handle $h$. The funnel-mouth or side opening, by which the milk enters, is lettered $k$, and is so shielded by its position that dirt dripping vertically cannot enter.

I can, if preferred, provide a cover with an opening through it into a sleeve depending from the under side of said cover, and to which it is rigidly attached. In such case I provide a hood or funnel, to which is rigidly attached a tube, which tube, fitting in the sleeve, allows the hood or funnel to be raised or lowered, or turned to right or left, as desired.

The strainer may, in such modification, be inserted in the end of said tube, which is easily removed for cleaning.

Fig. 4 is a vertical section representing this modification.

I claim as my improvement in milk-pails—

1. The hood C, inclined as shown, to shield the milk from falling dirt, having the vertical induction-port K, in combination with the cover B and pail A, as and for the purposes herein specified.

2. The window $d$, in combination with the hooded attachment B C and pail A, as described.

3. The hooded attachment B C, the former having the deep rim $b$, adapted to slide within the pail A, as and for the purposes specified.

4. The milk-pail cover herein described, consisting of the part B, the hood C, with its vertical induction-port K and window $d$, the strainers $a\ f\ g$, and the extended flange $b$, as and for the purposes specified.

In testimony whereof I have hereunto set my hand this 25th day of February, 1875, in the presence of two subscribing witnesses.

ALFRED M. BAILEY.

Witnesses:
 JOHN O. COUCH,
 LYMAN A. MILLS.